May 30, 1961

W. H. VESTAL 2,986,364

PUMP HOSE HANDLING APPARATUS

Filed Jan. 6, 1959

INVENTOR
Walter H. Vestal

BY  *David Rabin*

ATTORNEY

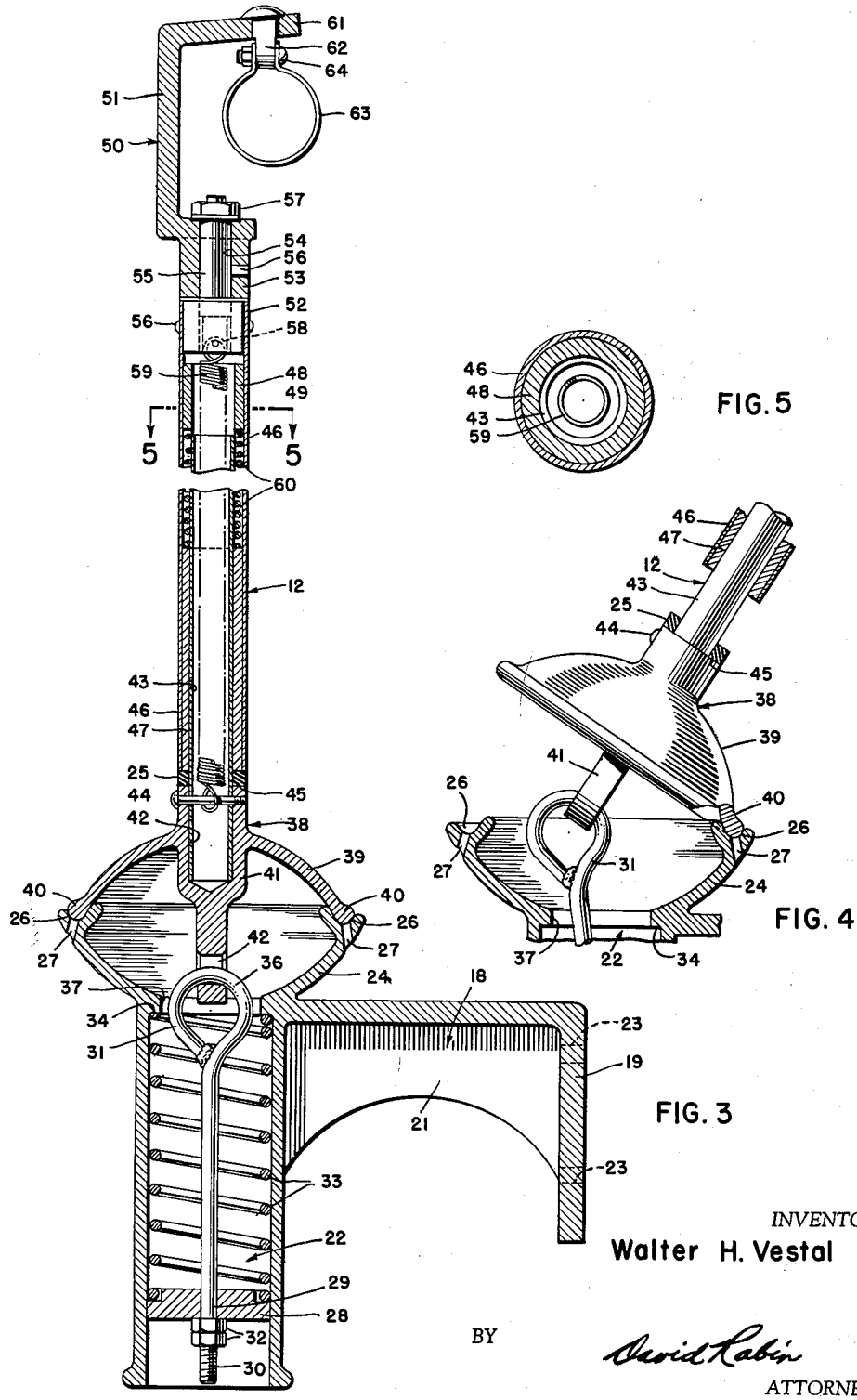
May 30, 1961 — W. H. VESTAL — 2,986,364
PUMP HOSE HANDLING APPARATUS
Filed Jan. 6, 1959
INVENTOR
Walter H. Vestal

United States Patent Office 2,986,364
Patented May 30, 1961

2,986,364
PUMP HOSE HANDLING APPARATUS
Walter H. Vestal, 820 Silver Ave., Greensboro, N.C.
Filed Jan. 6, 1959, Ser. No. 785,242
15 Claims. (Cl. 248—75)

The present invention relates generally to improvements in flexible hose retrieving means adapted to dispense gasoline or other motor fuel from a pump to automotive vehicles and relates more particularly to a flexible hose retrieving apparatus for mounting on a gasoline dispensing pump adapted for use in gasoline filling stations for elevating and supporting a flexible hose and for automatically retrieving the hose to an inoperative position.

It is not uncommon to observe in gasoline filling stations that the flexible hose for dispensing gasoline that is mounted on a gasoline-curb type pump is repeatedly dragged and scraped along the ground adjacent to the gasoline pump thereby accumulating grit, grease and oil thereon. Aside from the deteriorating effect on the wear-life of the hose casing and the high cost of replacement thereof, the grease and oil and grit which clings or impregnates the hose will often be deposited upon the painted surface of a motor vehicle on which the hose may come in contact. This is frequently the case when the motor vehicle to which the gasoline is being supplied presents the supply opening for the gasoline tank at a position remote from the gasoline pump.

Despite the careful attention of the service station attendant in order to avoid dragging or resting the supply hose on the body of an automobile, inevitably the hose will contact some portions of the painted surface and either scratch or mar the surface to some degree or deposit grease or oil thereon. It is particularly noticeable in those instances where the supply hose is provided with an overflow valve which enables the attendant to perform other duties while gasoline is being supplied to the automobile, to find the hose resting on the car body unattended by the attendant.

This invention is particularly adapted for use in combination with a gasoline dispensing apparatus or pump conventionally used in gasoline service stations in which a sheet metal housing encloses a motor-driven gasoline pump to the discharge end of which a relatively long and flexible gasoline supply hose is connected. Suitable gasoline metering means is mounted on the pump within the housing and the metered supply of gasoline is pumped through the flexible hose to the automobile gasoline tank through a manually actuatable control valve through which the gasoline may flow in the control valve open condition. Suitable metering devices, fluid flow indicators and other auxiliary equipment conventionally incorporated on standard gasoline pumps will be housed in the pump enclosure. Flexible hose retrieving apparatus of this inventive concept may be mounted on the side of the gasoline pump housing in an inconspicuous manner to support the hose in the inoperative position to which position the hose is yieldably and automatically returned.

It is an object of this invention to provide a combination flexible hose retrieving and supporting device for mounting on a gasoline pump housing to maintain a flexible hose above the ground and to support the hose reach out of engagement with a motor vehicle body while supplying gasoline to a gasoline tank.

This invention also contemplates the provision of an apparatus for yieldably supporting a flexible hose convolution in close relation to a gasoline pump which convolution may be extended for its effective reach to introduce the dispensing nozzle at one end of the hose to a gasoline tank inlet.

Still another objective of this invention is the provision of an elongatable hose guide arm mounted to yield in the direction of hose movement and reach.

A further object of this invention is to provide a means for guidably extending a flexible hose line in various positions and directions while maintaining a predetermined tension on the hose line to retain the line in an elevated position out of contact with the ground at each position of extension and utilization.

Yet a further objective of this inventive concept is to facilitate the ease of extension and withdrawal and return of a flexible hose line mounted on a gasoline pump in a plurality of directions.

Still other objects of this invention are to reduce the wear of a gasoline hose that is normally attendant by dragging along the ground, provide a hose line elevating an extension means to raise the hose line above an automobile being refueled, and a means for automatically retrieving and recovering the hose line to a predetermined storage or inoperative position adjacent to the gasoline pump.

Other objects and many of the attendant advantages of this novel flexible hose retrieving apparatus will become more readily apparent to those skilled in this art from a perusal of the following detailed description taken in conjunction with the accompanying drawings in which like characters of reference designate corresponding parts throughout the several views, and wherein:

Fig. 3 is an enlarged partial longitudinal sectional view of the hose retrieving apparatus, with a central section removed therefrom;

Fig. 4 is a partial elevational view, partially in section, of the coupling connecting the extendable guide arm on the base fixture mounting; and Fig. 5 is an enlarged transverse sectional view taken substantially along the plane of section line 5—5 of Fig. 3.

Figure 1:
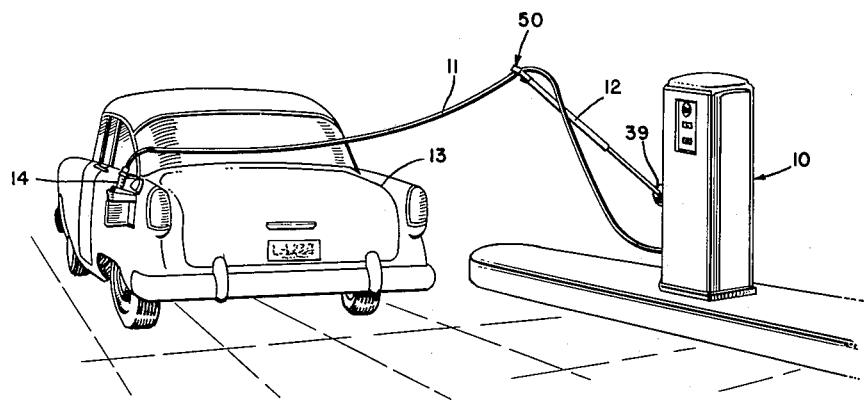
Fig. 1 is a perspective pictorial view of the hose line retrieving apparatus of this invention in operation refueling an automobile and illustrating the retrieving apparatus in an extended and tilted position while supporting the hose line above the ground and above the level of the vehicle body along the reach of the hose.

Referring to the drawings and particularly to Fig. 1, there is illustrated a curb-type gasoline dispensing apparatus or pump 10 on which there is mounted, in the operative pumping position, a flexible hose line 11 guidably trained and supported in its linear reach by a hose retrieving and supporting apparatus 12 which maintains the hose line in an elevated position above the ground and the rear end of the automobile 13 while the hose dispensing nozzle 14 is introduced into the fuel tank of the attended motor vehicle to be supplied with gasoline. The gasoline pumping apparatus is actually enclosed within a sheet metal housing in which the conventional metering devices, pumping equipment and related accessories are mounted with the inlet end (not shown) of the flexible hose 11 being connected to the discharge end of a pump permitting the hose length to extend through the opening 15 provided in the pump enclosure, with the main hose length being supported exteriorly of the housing.

Figure 2:
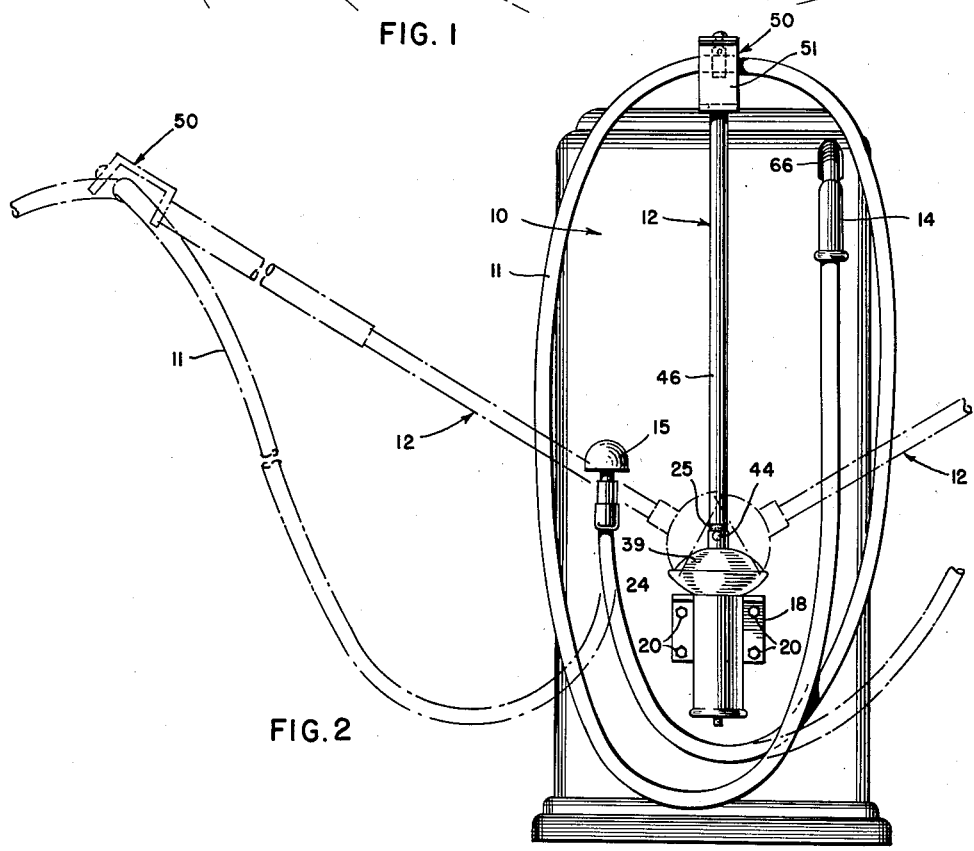
Fig. 2 is an enlarged side elevational view of a gasoline pump housing of Fig. 1 illustrating the hose retrieving apparatus mounted in position thereon and illustrating the apparatus and hose line in three positions of mounting and use.

As shown in Fig. 2, the flexible gasoline supply hose line extends from the pump housing and is draped about one side of the pump to form an exposed convolution. The hose length is supported intermediate its length adjacent to the free end of the retrieving apparatus 12 which apparatus is supported for pivoting and swivelling on the bracket 18 that is affixed to the side wall of the pump housing by means of the bolts 20 or other suitable fastening means.

Bracket 18 for supporting the upper section of the hose retrieving apparatus may be a casting or a weldment in which the supporting angle arm 19 and reinforcing rib 21 extend from the vertical cylindrical chamber 22. The arm 19 has spaced bolt-receiving openings 23 therein through which the bolts 20 are passed to be received within corresponding openings in the pump housing to clamp the bracket in position at a suitable level. A downwardly dished, spherically-shaped lower flange member 24 is in axial alignment with and positioned above the chamber 22. The flange member 24 is provided with an annular recess or seat 26 on the upper face thereof. Circumferentially spaced openings 27 through the flange recess facilitate water drainage therethrough.

A piston or plunger member 28 is slidably retained in the chamber 22 and has a central opening 29 therein in order to receive the threaded end 30 of the eyebolt 31. Suitable fastening nuts 32 on the bolt 30 releasably and adjustably retain the plunger member 28 in position on the bolt. A compression spring 33 encircles the bolt 31 and one end of the spring engages against the limit shoulder 34 in one end of the chamber 22. The other end of the spring 33 engages the inside face of the plunger member 28 and thereby constantly urges the plunger downwardly. The eye or head 36 of the eyebolt freely passes through the opening 37 in the chamber 22.

A vertical standard or stanchion 38 is provided with an upwardly dished spherically-shaped flange 39 having a peripheral rounded or head rim 40 for cooperation and registry with the annular recess 26 in the lower flange member 24. Depending from the central portion of the flange 39 is a boss 41 at the end of which is an eyebolt-receiving hook 42 for engaging within and retaining the eye of the bolt 31.

As shown in Fig. 3, the mating connection or engagement between the flanges forms a seating socket or coupling arrangement and in the fully seated condition the stanchion will be maintained in a vertical position as clearly shown.

The central boss 41 on the flange 39 is bored axially to form a blind hole 42 in order to receive the inner tubular member 43 therein with a press fit. The tubular member 43 may be retained in the hole 42 by means of the bolt or pin 44 extending transversely through the boss 41 and the tubular member 43. A resilient washer 25 encircles and is retained by suitable means on the inner tubular member 43 and rests on the terminal end 45 of the boss 40. An outer sleeve or tubular member 46, having a bearing or bushing 47 supported internally and at the lower end thereof, is retained in nested telescoping relation on the inner tubular member.

A short bearing or bushing 48 is securely fastened about the terminal end 49 of the inner tubular member 43 to provide bearing and guidance between the telescoping tubular members during extension and retraction thereof.

A hose clamp supporting fixture 50, having a C-shaped hose receiving head 51, is mounted on the terminal free end 52 of the outer member 46 with the fixture 50 being revolvably mounted on the threaded bolt 55 which extends through the axial bore 54 in the base of the fixture. The threaded bolt 55 extends through the spool member 53 mounted and retained in the terminal end 52 of the outer telescoping tubular member 46. The spool member is retained in position with the bolt by means of a retaining pin 56 which extends transversely therethrough. One end of bolt 55 is threadably engaged by the nut 57 seated against the base of the C-shaped head 51 and the other end of the bolt is provided with a spring retaining pin 58.

A tension coil spring 59 reaches, and is retained within the nested telescoping tubular members, between the pins 44 and 58 to yieldably urge the telescoping members into the retracted nested position as shown in Fig. 3. It will be apparent that when the telescoping members are projected, the coil spring 59 will be extended within the continuous axial cavity formed by the tubular members thereby urging the members to return to the fully retracted position.

It has been determined, in some instances, that when the telescoping members are fully extended, the tubular members may become clamped or hung in the extended position. To eliminate this possibility and to further assist in the return of the members, a relatively short compression coil spring 60 is introduced and retained against the bottom of bearing 48. In the fully extended position, the top bearing 48 will compress the spring 60 against the action of the bushing 47 to limit the travel of the telescoping members and thereby urge the members to return to the retracted position.

The top portion 61 of the C-head 51 of the fixture 50 is provided with a stud 62 to which is pivotally hinged a hose-encircling clamp 63 fastened to the stud 62 by means of the fastening bolt 64. The flexible hose 11 is introduced into the clamp 63 intermediate the hose length and retained therein.

In the inoperative position, when the hose retrieving apparatus is mounted on the side of a gasoline pump housing, the standard is retained in the vertical position through the action of the spring 33 which forces the piston 28 downwardly and in turn the eyebolt 31 is urged in the same direction promoting continuous engagement between the flange members 24 and 39 through the peripheral contact of the rim 40 with the recess 26 at some portion therebetween. The action of spring 58 similarly urges the telescoping tubular members 43 and 46 into the retracted nested position. With the flexible hose clamped on the terminal end of the fixture 50, the hose forms a partial loop which loop is completed when the gasoline dispensing nozzle 14 is introduced into the nozzle storage well 66 in the side of the pump housing.

In operation, the operator upon removing the nozzle 14 from the well 66 will extend the hose in the desired direction toward a tank to be filled with gasoline and the stanchion or standard will be urged to tilt in the direction of the hose extension. The cooperating flanged surfaces will permit guided tilting of the stanchion with respect to the bracket flange and the peripheral surface contact between the flanges will depend on the angle of tilt between the standard and the bracket. As will be evident, the rim 40 and the recess 26 provides an open hinge or coupling connection yielding in whatever direction the hose line is directed and this connection will permit some rotatable movement of the stanchion together with some rotation due to the connection of the hose connecting fixture 50. As additional hose length is demanded, the telescoping members will yieldably extend under the control of the tension spring 58. As the telescoping members are extended, the hose will be trained to follow the specific path at an elevation above the ground and the vehicle.

To limit the travel of the standard from the vertical position and to preclude displacement below a horizontal position, the opening 37 forming the shoulder 34 in the chamber 22 on the bracket may be decreased to contact the eyebolt and thereby limit the angle of travel. In this manner the extent of standard or stanchion displacement from the vertical may be limited to retain the hose in a selected position of elevation. As illustrated in Fig. 4, the orientation of the components forming the connection between the flanges and the surface contact therebetween may be limited by the angular displacement of the standard from the vertical. However, as illustrated in Fig. 4, there is adequate contact between the flanges to support the stanchion within the limits shown.

Obviously, a relatively rigid eyebolt need not be employed and a flexible connection may be equally suitable for connecting the vertical standard to the spring 33.

Upon withdrawal of the nozzle 14 and release of the tension on the hose, the action of the spring 33 will automatically urge the standard to return to the vertical position thereby reforming the hose convolution which will be complete upon reintroduction of the hose nozzle into the well 66.

It will thus be apparent that the hose retrieving and supporting apparatus disclosed herein is capable of directing a length of hose during use in a specific direction and to retain the hose in an elevated position during use, and retrieve the hose automatically after use.

It will be obvious that many modifications and variations may be made in the construction and arrangement of the flanges and the contacting surfaces as well as the orientation of the telescoping members without departing from the present inventive concept and the real spirit and purpose of this invention. A rearrangement of components and alternatives as well as the use of mechanical equivalents for those herein illustrated are reasonably included and modifications are contemplated.

What is claimed is:

1. A hose supporting and retrieving apparatus adapted to be supported on a gasoline pump housing comprising a bracket mounted on the pump housing including a first coupling flange and a cylindrical chamber, a piston slidably displaceable in said chamber, a rod having one end operatively connected to said piston and the other end having a connecting means thereon, and a spring encircling said rod to normally displace the piston in a predetermined direction, a stanchion having a second coupling flange to cooperate with said first coupling flange to form a circumferential socket, means on said second coupling for engaging said connecting means on the rod to yieldably retain the couplings in circumferential engagement, a pair of nestable telescoping tubular members supported on the stanchion at the free end of one of said members, means for yieldably retaining the said tubular members in nested retracted condition, means at the free end of the other end of said members for clamping the hose intermediate the length thereof whereby upon extending the hose the stanchion will tilt about the coupling connection and the telescoping members will extend longitudinally to prolong the reach of and maintain the hose at an elevated position.

2. A hose supporting and retrieving apparatus adapted to be supported on a gasoline pump housing comprising a bracket mounted on the pump housing including a first coupling flange, a stanchion having a second coupling flange to cooperate with said first coupling flange to form a circumferential socket, spring biasing means for maintaining contact between said flanges and to permit tilting therebetween, a pair of nestable telescoping tubular members supported on the stanchion at the free end of one of said members, means for yieldably retaining the said tubular members in nested retractable condition, means at the free end of the other end of said members for clamping the hose intermediate the length thereof whereby upon extending the hose the stanchion will tilt about the flanges and the telescoping members will extend longitudinally.

3. A hose supporting and retrieving apparatus adapted to be supported on a gasoline pump housing comprising a bracket mounted on the pump housing including a first coupling flange having a peripheral surface, a stanchion having a second coupling flange having a peripheral surface to cooperate with the first coupling flange to form a circumferential socket means therebetween, means to yieldably maintain at least a portion of said surfaces in engagement, a pair of nestable telescoping members supported on the stanchion, means for yieldably retaining the said members in nested retractable condition, means at the free end of one of said members for clamping the hose intermediate the length thereof whereby upon extending the hose the stanchion will tilt about the coupling connection and the telescoping members will extend longitudinally.

4. A hose supporting and retrieving apparatus for use in combination with a gasoline dispensing pump and flexible hose comprising a bracket adapted to be mounted on the pump at a suitable elevation, a standard resiliently mounted on the bracket for pivotal movement from a vertical position, a pair of telescoping members supported at one end on the standard with a vertically extending free end, said members having means for normally urging the members in a retracted position, and means for supporting a flexible hose at the free end of one of the telescoping members to elevate the hose to a suitable level above the ground in the standard tilted and telescoping members extended position.

5. A hose supporting and retrieving apparatus for use in combination with a gasoline dispensing pump and flexible hose comprising a bracket adapted to be mounted on the pump at a suitable elevation, a standard mounted on the bracket for pivotal movement from a vertical position, telescoping members mounted at one end on the standard having a vertically extending free end, said members having means for normally urging the members to a retracted position, and means for supporting a flexible hose at the free end of one of the telescoping members to elevate the hose to a suitable level above the ground.

6. A hose supporting and retrieving apparatus for use in combination with a gasoline dispensing pump and flexible hose comprising a bracket adapted to be mounted on the pump at a suitable elevation, a pair of telescoping members resiliently mounted for tilting on the bracket, said members having means for normally urging the members in a retracted position, and means for supporting a flexible hose on one of the telescoping members to elevate the hose to a suitable level above the ground.

7. A hose supporting and retrieving apparatus for use in combination with a gasoline dispensing pump and a flexible hose comprising a bracket adapted to be mounted on the pump, a stanchion having telescoping nestable members mounted thereon at one end and a vertically extending free end, a swivel coupling means formed at the top of said bracket and the bottom of said stanchion, yieldable means pivotally connecting the stanchion and the bracket, and means for retaining the flexible hose intermediate the hose length at the free end of one of the telescoping members.

8. A hose supporting and retrieving apparatus for use in combination with a gasoline dispensing pump and a flexible hose comprising a bracket adapted to be mounted on the pump, telescoping nestable members mounted thereon and having a vertically extending free end, a yieldable swivel coupling means connecting said bracket and telescoping members, and means for retaining the flexible hose at the free end of one of the telescoping members.

9. A hose supporting and retrieving apparatus for use in combination with a gasoline dispensing pump and a flexible hose comprising a stanchion having telescoping nestable members mounted thereon at one end and a vertically extending free end, a yieldable swivel coupling means and bracket for supporting said stanchion to the pump, means for yieldably retracting the telescoping members, and means for retaining the flexible hose on the free end of one of the telescoping members.

10. A hose supporting and retrieving apparatus for use in combination with a gasoline dispensing pump and adapted to be mounted thereon comprising a bracket for supporting the retrieving apparatus on the pump and having a coupling with a circumferential groove and a cylindrical chamber in axial alignment therewith, a stanchion having a coupling with a mating portion for said circumferential groove, at least a pair of telescoping nestable members supported on the stanchion coupling at the free end of one of the members, means for yieldably urging the members in the nested retracted position, means at the free end of the other member for retaining a hose thereon intermediate the hose length, and means yieldably connecting the stanchion and the bracket to form a peripheral seat therebetween in the stanchion upright condition.

11. A hose supporting and retrieving apparatus for use in combination with a gasoline dispensing pump and adapted to be mounted thereon comprising a bracket for supporting the retrieving apparatus on the pump and having a coupling with a circumferential groove and a cylindrical chamber in axial alignment therewith, a stanchion having a coupling with a mating portion for said circumferential groove, at least a pair of telescoping nestable members supported on the stanchion coupling at the free end of one of the members, means for yieldably urging the members in the retracted nested position, swivel and rotatable means at the free end of the other member for retraining a hose thereon intermediate the hose length, and means yieldably connecting the stanchion and the bracket to form a peripheral seat therebetween in the stanchion upright condition.

12. A hose retrieving and supporting apparatus having a bracket adapted to be mounted on the pump housing and a tiltable stanchion mounted on said bracket, said stanchion having at least a pair of nestable telescoping members supported thereon, at one end and having a vertically extending free end, said members having yieldable means for normally retaining the members in the retractable condition, rotatable means on the free end of one of said members for supporting a flexible hose, and means pivotally and yieldably connecting the stanchion and the bracket.

13. A hose retrieving and supporting apparatus having a bracket adapted to be mounted on the pump housing and a tiltable stanchion mounted on said bracket, said stanchion having nestable telescoping members supported thereon at one end, means for normally retaining the said members in the retracted nested condition, means on the free end of one of said members for supporting a flexible hose, and yieldable means connecting the stanchion and the bracket for swivelling action therebetween.

14. A hose supporting and retrieving apparatus for use in combination with a gasoline dispensing pump having a flexible hose for dispensing gasoline comprising a bracket having a first seating member, a standard having a second seating member cooperatively mating with the first member, a resilient restoring means connecting the standard and bracket to yieldably retain alignment and seating engagement between said members, a pair of telescoping members supported on the standard, said telescoping members having means for yieldably retaining the members in a retracted condition, means for clamping a hose intermediate its length to the free end of one of the telescoping members remote from the standard whereby upon extension of the hose the standard will yieldably tilt in the direction of hose movement and the telescoping members will yieldably extend in the direction of hose reach to retain the hose in an elevated position.

15. A hose supporting and retrieving apparatus for use in combination with a gasoline dispensing pump having a flexible hose for dispensing gasoline comprising a bracket having a first coupling member, a standard having a second coupling member cooperatively mating with the first member, a resilient restoring means connecting the standard and bracket to yieldably retain alignment and mating engagement between said members, telescoping members supported on the standard, said telescoping members having means for yieldably retracting the members in nested relation, means for clamping a hose adjacent to the free end of one of the telescoping members remote from the standard whereby upon extension of the hose the standard will yieldably tilt in the direction of hose movement and the telescoping members will yieldably extend in the direction of hose reach to maintain the hose in an elevated position.

References Cited in the file of this patent

UNITED STATES PATENTS

| | | |
|---|---|---|
| 1,519,725 | Farley | Dec. 16, 1924 |
| 1,604,813 | Ewald | Oct. 26, 1926 |
| 2,477,366 | Easton | July 26, 1949 |
| 2,742,320 | Grise | Apr. 17, 1956 |